US011415055B2

United States Patent
Alstad et al.

(10) Patent No.: US 11,415,055 B2
(45) Date of Patent: Aug. 16, 2022

(54) ALTERNATING HELICOID CELL STRUCTURE AND METHODS OF PRODUCING THE SAME

(71) Applicant: HONEYWELL INTERNATIONAL INC., Morris Plains, NJ (US)

(72) Inventors: Shawn Alstad, Phoenix, AZ (US); William B. Schuster, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 339 days.

(21) Appl. No.: 16/812,781

(22) Filed: Mar. 9, 2020

(65) Prior Publication Data

US 2021/0277828 A1 Sep. 9, 2021

(51) Int. Cl.
*F02C 7/24* (2006.01)
*E04B 1/84* (2006.01)

(52) U.S. Cl.
CPC ............ *F02C 7/24* (2013.01); *E04B 1/84* (2013.01); *E04B 2001/8428* (2013.01); *E04B 2001/8485* (2013.01); *F05D 2250/25* (2013.01)

(58) Field of Classification Search
CPC ........... E04B 1/84; E04B 2001/8428; E04B 2001/8485; F02C 7/24; G10K 11/16; G10K 11/172; F05D 2250/25
See application file for complete search history.

(56) References Cited

U.S. PATENT DOCUMENTS

| 3,887,031 | A | * | 6/1975 | Wirt | ...... G10K 11/172 181/292 |
| 4,106,587 | A | * | 8/1978 | Nash | ...... F02K 1/827 181/290 |
| 8,997,923 | B2 | * | 4/2015 | Ichihashi | ...... F02C 7/045 181/292 |
| 2005/0016792 | A1 | | 1/2005 | Graefenstein | |
| 2007/0221440 | A1 | | 9/2007 | Gilliland | |
| 2008/0164090 | A1 | | 7/2008 | Wang | |
| 2014/0027199 | A1 | | 1/2014 | Claeys et al. | |

(Continued)

FOREIGN PATENT DOCUMENTS

| CN | 105452643 B | 11/2018 | |
| EP | 3454329 A1 | 3/2019 | |
| FR | 3085783 A1 | * 3/2020 | ...... B32B 15/20 |

*Primary Examiner* — Jeremy A Luks
(74) *Attorney, Agent, or Firm* — Lorenz & Kopf, LLP

(57) ABSTRACT

An alternating clockwise and counterclockwise helicoid cell structure for use in acoustic panels. The cell structure geometry may be easily replicated and tiled using additive manufacturing. The cell structure has at least an outer cavity and an inner cavity. The cavities are coaxial, share the same height, same entrance side, and same cell structure floor. The inner cavity includes a number of equal-volume inner chambers rotated uniformly in a first direction around the shared central axis; and the outer cavity includes a second number of equal-volume outer chambers rotated uniformly in an opposite direction to the first direction around the shared central axis. In various embodiments, one or more perforated baffles may extend, internally, across a chamber, perpendicular to direction of sound waves at the location of the perforated baffle. In various embodiments, one or more port openings from the outer cavity to the inner cavity may be present.

20 Claims, 11 Drawing Sheets

(56) References Cited

U.S. PATENT DOCUMENTS

| | | | |
|---|---|---|---|
| 2014/0209408 A1* | 7/2014 | Morvant | F02C 7/24 |
| | | | 181/224 |
| 2015/0041248 A1* | 2/2015 | Ichihashi | F02C 7/045 |
| | | | 29/896.2 |
| 2015/0373470 A1* | 12/2015 | Herrera | G10K 11/172 |
| | | | 156/196 |
| 2017/0292453 A1 | 10/2017 | Rami et al. | |
| 2018/0135514 A1* | 5/2018 | Setty | F02C 7/045 |
| 2018/0230905 A1 | 8/2018 | Riou et al. | |
| 2019/0063318 A1* | 2/2019 | Roach | G10K 11/172 |
| 2019/0080679 A1* | 3/2019 | Alstad | G10K 11/16 |
| 2019/0112803 A1* | 4/2019 | Alstad | G10K 11/172 |
| 2020/0043456 A1* | 2/2020 | Zhang | F01N 1/087 |
| 2020/0164997 A1* | 5/2020 | Brochard | G10K 11/168 |
| 2020/0239125 A1* | 7/2020 | Prakash | B64C 1/40 |

\* cited by examiner

ALTERNATING HELICOID CELL STRUCTURE AND METHODS OF PRODUCING THE SAME

TECHNICAL FIELD

The present disclosure generally relates to cell structures for use in acoustic panels and methods of producing the same, and more particularly relates to an alternating clockwise and counterclockwise helicoid cell structure for acoustic panel applications, and methods of producing the same.

BACKGROUND

In a variety of applications, such as aircraft, aircraft engines, automotive, mining, farming, audio equipment, heating ventilation and air conditioning (HVAC), and the like, pressure waves are generated in a broad range of audible frequencies. The audible frequencies are sound waves, generally experienced as noise. This undesirable noise presents a technological problem.

Available solutions for undesirable noise include acoustic panels to dampen the sound waves. In a first order approach, the performance of a given acoustic panel is generally increased by increasing its surface area. However, technological challenges in manufacturing and material forming techniques often limit the amount of surface area available. This surface area constraint often leads to implementing acoustic panel designs that employ only a single degree of freedom (damping sound waves at a single frequency) or a double degree of freedom (damping sound waves at two frequencies), thereby not meeting desired acoustic performance objectives. Therefore, continued improvements in acoustic panel design are desired.

Accordingly, it is desirable to provide a technologically improved acoustic cell structure that achieves the desired acoustic performance of damping a wide range of audible frequencies, while also being easily arrayed and integrated into a variety of acoustic panel dimensions, suitable for a wide range of applications. Additionally, the desirable acoustic cell structure geometry is manufacturable using additive manufacturing techniques. Furthermore, other desirable features and characteristics of the present embodiment will become apparent from the subsequent detailed description and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a cell structure for use in an acoustic panel. The cell structure including: a first cavity having a regular shape cross section perpendicular to a central axis, the first cavity having a continuous first boundary wall, the first cavity having a floor side, a cell height, and an entrance side defined by a first incircle, the floor side covered by a cell structure floor; a second cavity disposed coaxially within the first cavity, the second cavity having the regular shape cross section perpendicular to the central axis, the second cavity having a continuous second boundary wall, the second cavity having a floor side covered by the cell structure floor, the cell height, and an entrance side defined by a second incircle; a first number of inner chambers disposed within the second cavity from the second cavity entrance side to the cell structure floor, each of the inner chambers having an equal inner chamber cross sectional area created by radially dividing the second incircle, the inner chambers being rotated in a first direction around the central axis by at least p rotations per inch from the second cavity entrance side to the cell structure floor; and a second number of outer chambers disposed in a volume between the continuous first boundary wall and the continuous second boundary wall, from the first cavity entrance side to the cell structure floor, each of the outer chambers having an equal outer chamber cross sectional area created by radially dividing the first incircle into equally sized outer sections, the outer chambers being rotated around the central axis in an opposing direction to the first direction by the at least p rotations per inch from the first cavity entrance side to the cell structure floor; a partition dividing an outer chamber into two modified outer chambers; and a port opening from the divided outer chamber into the inner cavity, the port opening positioned near the partition.

A cell structure for use in an acoustic panel is provided. The cell structure includes: a continuous first boundary wall having a cell height measured between a floor side and an entrance side, the continuous first boundary wall having a central axis and defining a first cavity with a regular shape cross section perpendicular to the central axis; a continuous second boundary wall disposed coaxially within the first cavity and defining a second cavity, the second cavity having the regular shape cross section perpendicular to the central axis, the second cavity having a floor side covered by the cell structure floor, the cell height, and an entrance side defined by a second incircle; a first number of inner chambers disposed within the second cavity from the second cavity entrance side to the cell structure floor, each of the inner chambers having an equal inner chamber cross sectional area created by radially dividing the second incircle, the inner chambers being rotated in a first direction around the central axis by at least p rotations per inch from the second cavity entrance side to the cell structure floor; and a second number of outer chambers disposed in a volume between the continuous first boundary wall and the continuous second boundary wall, from the first cavity entrance side to the cell structure floor, each of the outer chambers having an equal outer chamber cross sectional area created by radially dividing the first incircle into equally sized outer sections, the outer chambers being rotated around the central axis in an opposing direction to the first direction by the at least p rotations per inch from the first cavity entrance side to the cell structure floor.

An acoustic panel is provided. The acoustic panel includes: an array of a plurality of helicoid cell structures, each helicoid cell structure comprising: a continuous first boundary wall having a cell height measured between a floor side and an entrance side, the continuous first boundary wall having a central axis and defining a first cavity with a regular shape cross section perpendicular to the central axis; a continuous second boundary wall disposed coaxially within the first cavity and defining a second cavity, the second cavity having the regular shape cross section perpendicular to the central axis, the second cavity having a floor side covered by the cell structure floor, the cell height, and an entrance side defined by a second incircle; a first number of inner chambers disposed within the second cavity from the second cavity entrance side to the cell structure floor, each of the inner chambers having an equal inner chamber cross sectional area created by radially dividing the second incircle, the inner chambers being rotated in a first direction around the central axis by at least p rotations per inch from the second cavity entrance side to the cell structure floor; and a second number of outer chambers disposed in a volume between the continuous first boundary wall and the continuous second boundary wall, from the first cavity entrance side to the cell structure floor, each of the outer chambers having an equal outer chamber cross sectional area created by radially dividing the first incircle into equally sized outer sections, the outer chambers being rotated around the central axis in an opposing direction to the first direction by the at least p rotations per inch from the first cavity entrance side to the cell structure floor; and a continuous surface layer comprising, for each of the plurality of helicoid cell structures, a respective perforated lid.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein:

FIGS. 11-12 are three-dimensional diagrams of a single helicoid cell structure, depicting more than two cavities, in accordance with cylindrical embodiments.

DETAILED DESCRIPTION

Figure 1:
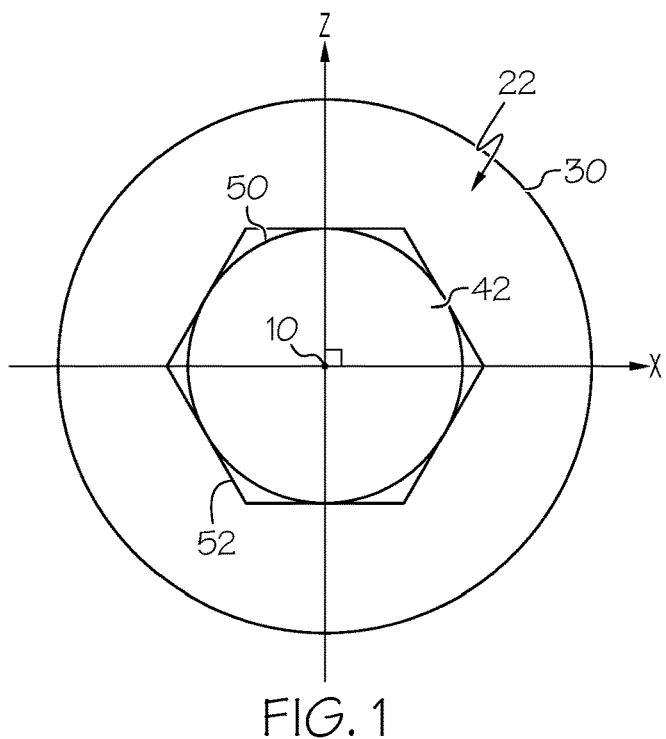
FIGS. 1-7 are two- and three-dimensional diagrams depicting size and geometric relationship aspects of a single helicoid cell structure, in accordance with an embodiment.

The following detailed description is merely exemplary in nature and is not intended to limit the various embodiments or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

Additive manufacturing is referenced herein. Additive manufacturing, sometimes referred to as 3D printing, is a process in which an object is formed via successive layering using feed material, and this layering process advantageously averts many complex tooling steps in many instances. A given additive manufacturing process may be automated or computer-controlled such that a desired object or article is fabricated on a layer-by-layer basis in accordance with computer-readable design data, such as Computer Aided Design (CAD) files, defining the shape and dimensions of the object. In some additive manufacturing processes, such as direct metal laser sintering (DMLS), the feed material used for metallic parts of an object may be a powdered metal. In the powdered feed material process, powdered metal can be applied to a base and melted in desired locations. The powdered feed material may be melted with a laser beam. The melted powder is solidified to form a layer of the desired product. More metal powder is provided and melted in desired locations to form the next layer, and the process proceeds. In other additive manufacturing processes, the source material may be supplied as a powder or in a different form (e.g., as a wire feed, the source material may be metallic or non-metallic, and other types of targeted energy (e.g., laser or electron beams) may be utilized to successively deposit the source material in desired locations on a base or on previous layers to gradually build up a desired shape.

A novel alternating clockwise and counterclockwise helicoid cell structure (shortened herein to "helicoid cell structure") for use in acoustic panels is introduced herein. The provided helicoid cell structure has a geometry that may be easily replicated and tiled to thereby create an array comprising a plurality of interconnected helicoid cell structures. The provided cell structure is designed to have at least an outer cavity and an inner cavity. The cavities are coaxial, share the same height, same entrance side, and same cell structure floor. The inner cavity includes a number of equal-volume inner chambers rotated uniformly in a first direction around the shared central axis; and the outer cavity includes a second number of equal-volume outer chambers rotated uniformly in an opposite direction to the first direction around the shared central axis. In various embodiments, one or more perforated baffles may extend, internally, across a chamber, perpendicular to direction of sound waves at the location of the perforated baffle. In various embodiments, one or more port openings from the outer cavity to the inner cavity may be present. The helicoid cell structure is described in detail in connection with FIGS. 1-14 below.

Figure 2:
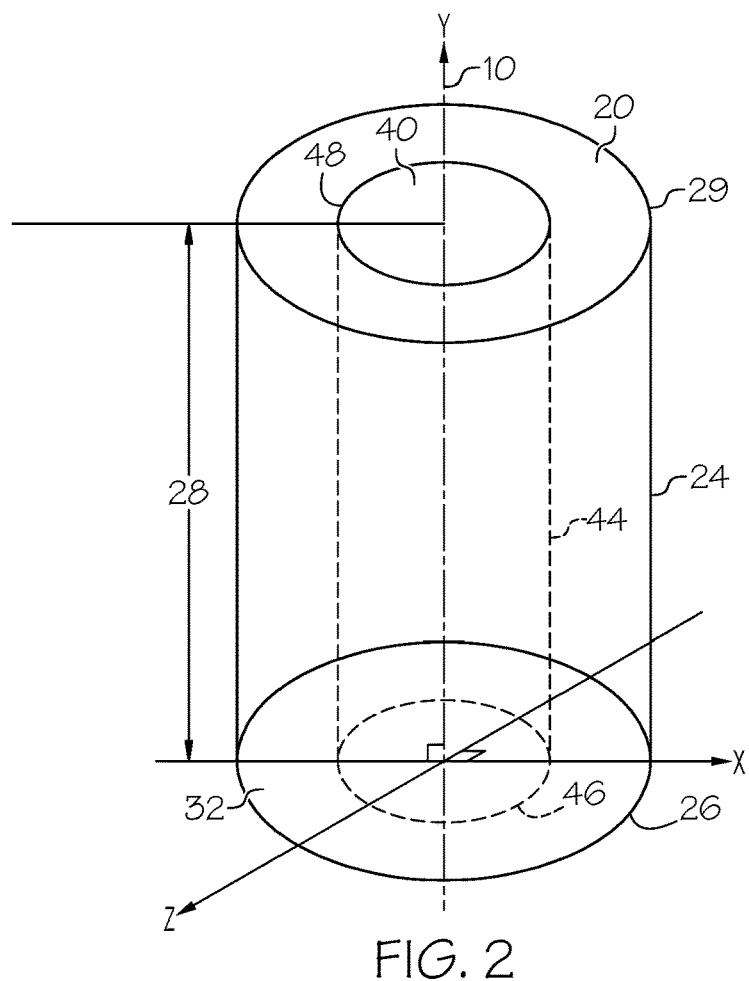

Turning now to FIGS. 1-7, a helicoid cell structure is described, in accordance with various embodiments. The height of the helicoid cell is measured along a central axis 10, in the Y-axis direction, and the X-axis and Z-axis depict a horizontal or floor side. Turning to FIGS. 1-2, the helicoid cell structure comprises an outer first cavity 20 and an inner second cavity 40. The first cavity 20 is created, or defined by its boundaries: a continuous first boundary wall 24, a floor side 26, and a cell height 28, which demarks the distance between the floor side 26 and an entrance side 29. The entrance side 29 is an open side of the first cavity 20 that is defined by a first incircle 30, the floor side 26 is covered by a cell structure floor 32. The first cavity 20 is further defined by a regular-shape cross section 22, which is measured perpendicular to the central axis 10; the regular-shape is consistent, along the entire cell height 28. In the depicted embodiment, the regular shape is a circle, but in other embodiments, the regular shape may be a hexagon, an octagon, or any other geometrically regular shape.

The inner second cavity 40, is disposed coaxially within the first cavity 20. The second cavity 40 is also defined by its boundaries: a continuous second boundary wall 44 that is also of the cell height 28, the second cavity having a floor side 46 that is also covered by the cell structure floor 32, the cell height 28, and an entrance side 48 defined by a second incircle 50. The second cavity 40 has the same regular-shape cross section perpendicular to the central axis 10 that the first cavity 20 has. In other words, if the first cavity 20 has a circular cross section, the second cavity 40 also has a circular cross section; if the first cavity 20 has a hexagonal cross section, the second cavity 40 also has a hexagonal cross section; if the first cavity 20 has an octagonal cross section, the second cavity 40 also has an octagonal cross section.

As mentioned, each cavity may have a circular, hexagonal, octagonal, or other regular shape. Each of these shapes may be mathematically defined by an incircle, or inscribed circle, that is the largest circle that touches all of its sides. The incircle measurement is taken at the entrance side (29, 48) of the helicoid cell. For example, the hexagon 52 is associated with the incircle 50 (see, also, FIG. 13, incircle 602).

Figure 3:
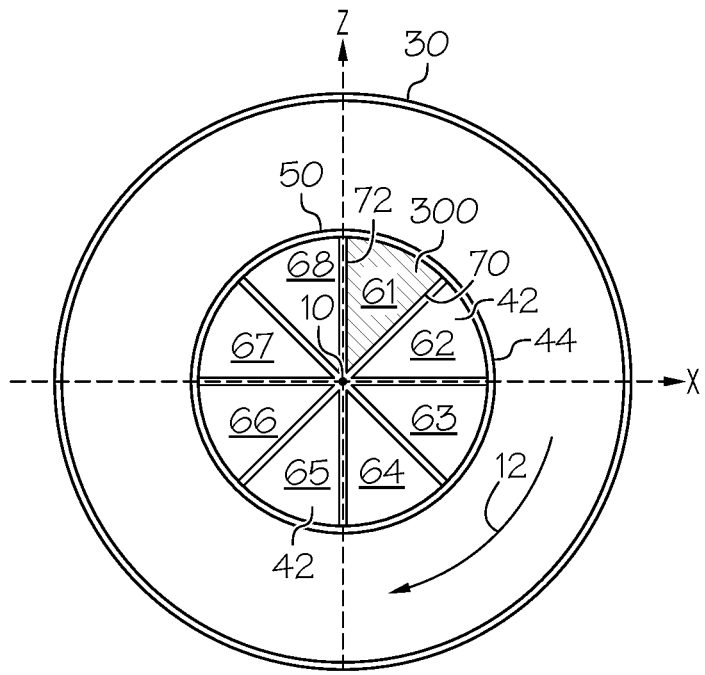
Figure 4:
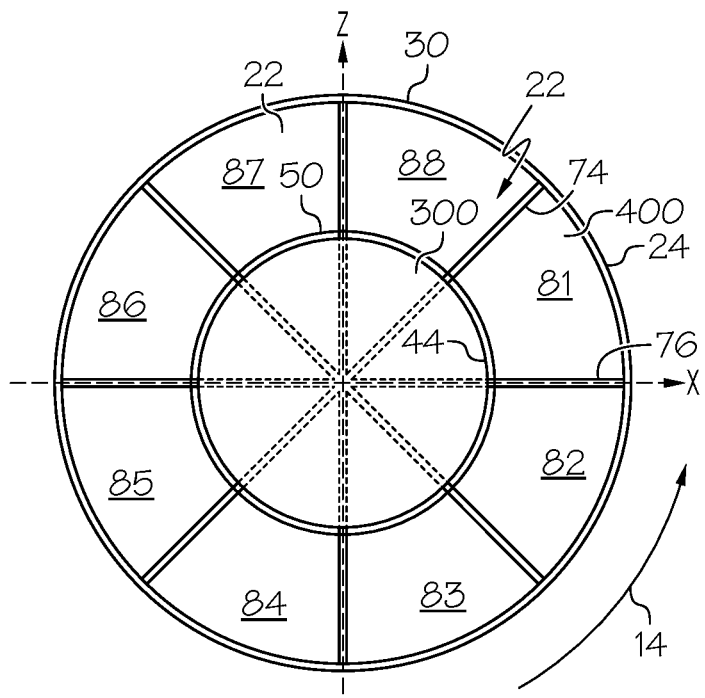
Figure 5:
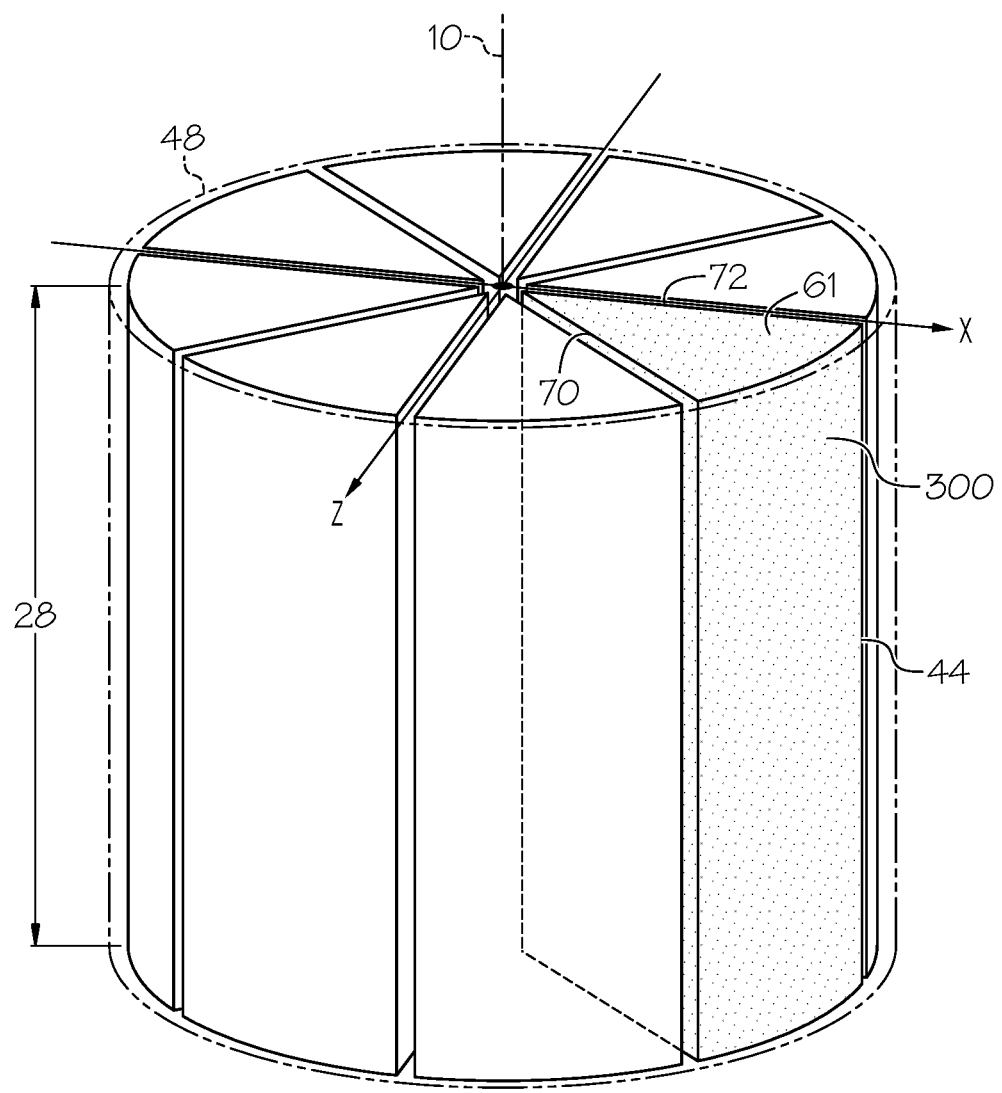

Moving now to FIGS. 3-5, and with continued reference to FIGS. 1-2, inner chambers of the helicoid cell structure are described. A first number (N) of inner chambers are disposed within the second cavity 40, extending from the second cavity entrance side 48 to the cell structure floor 32, each of the inner chambers is created by radially dividing, equally, the second incircle 50 with inner chamber walls of equal thickness. In the depicted example, N is 8, and inner chamber cross sectional areas 61, 62, 63, 64, 65, 66, 67, and 68 are each equal in size. The inner chambers are, as may be appreciated, three dimensional volumes. For example, inner chamber cross sectional area 61 is an entrance side area of an inner chamber volume 300, which is bounded by inner chamber wall 70, inner chamber wall 72, second boundary wall 44, and cell structure floor 46. Each inner chamber has an equal initial length, which is cell height 28. Each inner chamber has equal initial inner chamber volume 300.

This same process may then be performed to create chambers in a volume between the continuous first boundary wall 24 and the continuous second boundary wall 44; these chambers may be referred to as being the chambers "of the first cavity" for simplification, even though they do not include the volume of the second cavity. A second number (M) of outer chambers are disposed within the volume between the first boundary wall 24 and the second boundary wall 44, extending from the first cavity entrance side 29 to the cell structure floor 32, each of the outer chambers having an equal outer chamber cross sectional area at the entrance side that is created by radially dividing, equally, the first incircle of the first cavity 20 with outer chamber walls of equal thickness. In the depicted example, M is equal to N, or 8, and outer chamber cross sectional areas 81, 82, 83, 84, 85, 86, 87, and 88 are each equal in size. The respective outer chambers are three dimensional volumes. For example, outer chamber cross sectional area 81 is associated with an outer chamber volume that is bounded by outer chamber wall 74, outer chamber wall 76, second boundary wall 44, first boundary wall 24, and cell structure floor 32. Each outer chamber initially has an equal length, which is cell height 28, and therefore, each outer chamber has equal volume.

Figure 7:
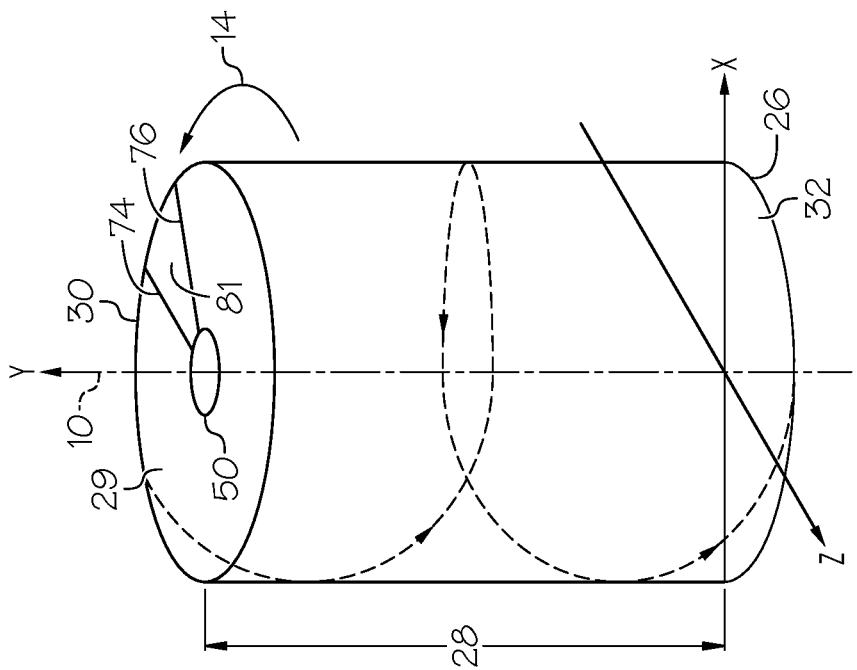
Figure 6:
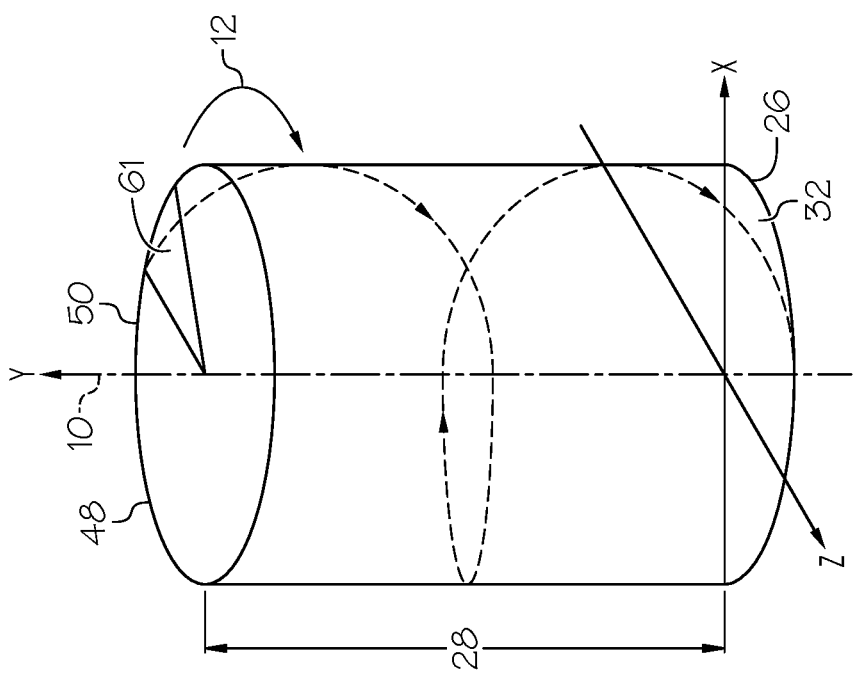

As illustrated in FIGS. 6 and 7, the inner chambers and outer chambers are further rotated around the central axis, providing the alternating helicoid feature, as follows. The rotation extends the initial length of the chambers, but the quality of equal volume remains. Additionally, the quality of an equal cross sectional area, measured perpendicular to the central axis 10, remains. To simplify FIG. 6 and FIG. 7, the volume of the inner chamber and outer chamber is not depicted, only the cross sectional area at the entrance side is depicted, however it is to be appreciated that the chambers, as described above, are rotated as described herein, keeping their quality of equal volume. The inner chambers are rotated in a first direction (e.g., clockwise 12) around the central axis 10, with a pitch (p) rotations per inch, starting at the second cavity entrance side 48 and ending at the cell structure floor 32. The outer chambers are rotated around the central axis 10 with the same pitch (p rotations per inch) in an opposing direction to the first direction (e.g., counterclockwise 14) from the first cavity entrance side 29 to the cell structure floor 32. A p value equal to 25% to 100% larger than the cell height 28 provides the most benefit. The higher the p value, the more helical turns per inch, and hence, the longer the chamber lengths. This allows better attenuation for lower frequencies for a given weight and space; when a plurality of these helicoid cell structures are arrayed into an acoustic liner, they deliver a technologically improved acoustic liner with a weight and space advantage over available acoustic liners. The partition breaks up some of these longer cavities into varying length shorter cavities to allow for broad band attenuation.

Figure 8:
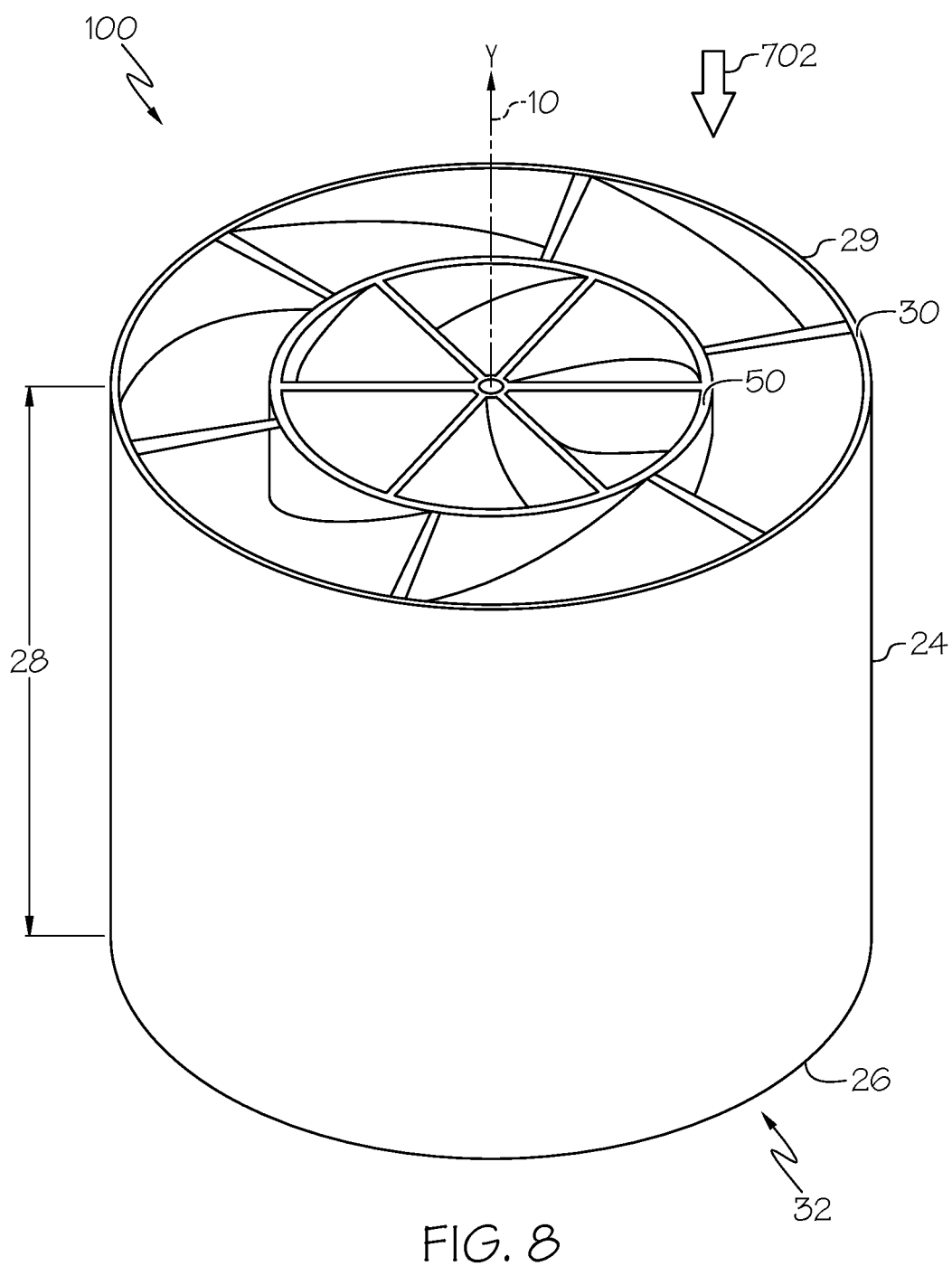
FIGS. 8-9 are three-dimensional diagrams of a single helicoid cell structure, further illustrating the alternating helicoid feature, in accordance with another embodiment.

Thus, there has been described a first exemplary embodiment having N=8, and M=8; however, other embodiments are supported. FIG. 8 provides a three-dimensional image of an exemplary embodiment of a helicoid cell structure 100, in which N=6, and M=6. Sound waves 702 approach the helicoid cell structure 100 from the entrance side (29, 48) and then get diverted downward, through the respective chambers.

Figure 9:
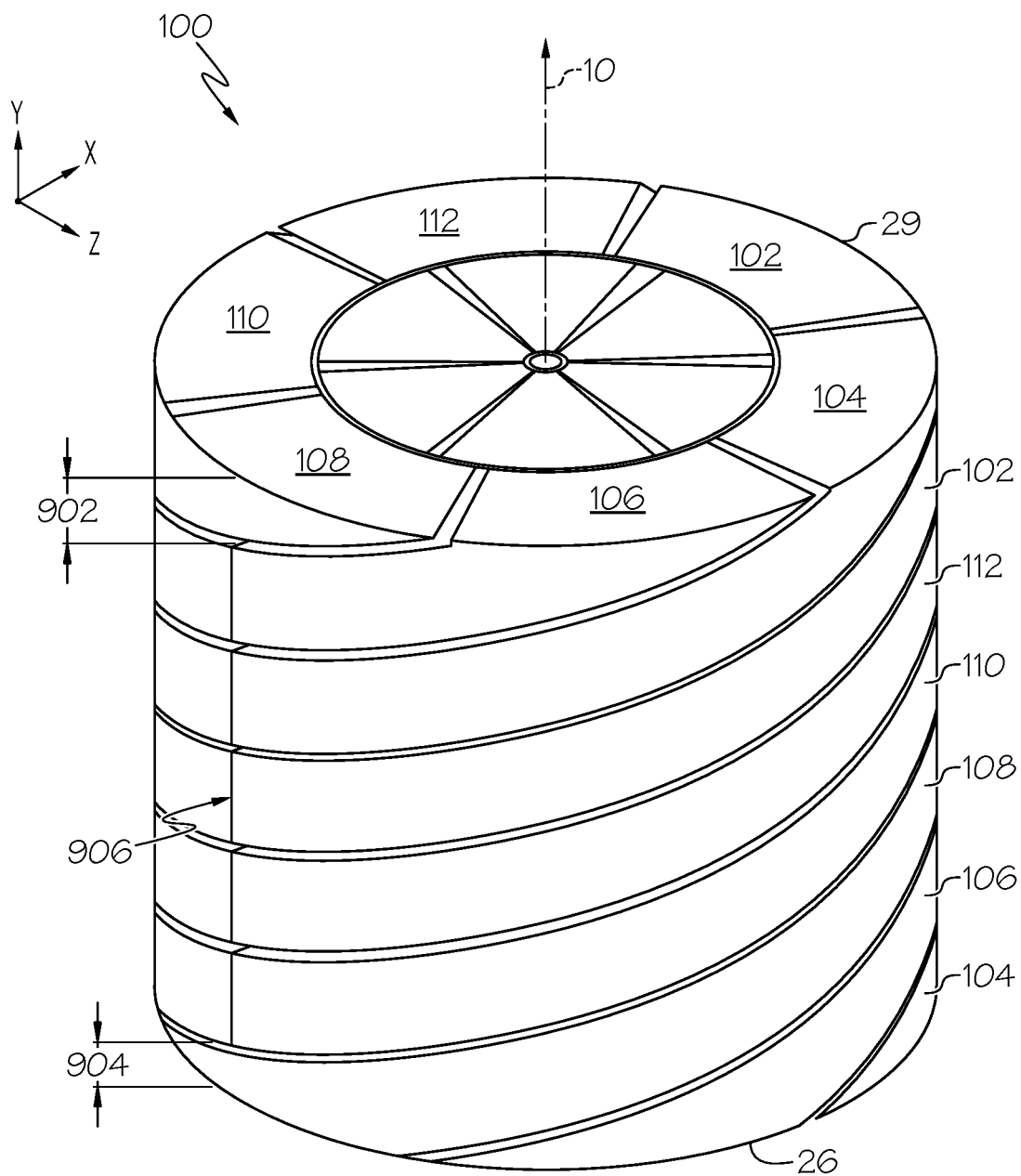

In various embodiments, as shown in FIG. 9, a partition is included in the helicoid cell structure 100. The partition 906 vertically bisects the helicoid cell structure 100, through the outer chambers. The partition 906 is planar, positioned radially, and extends vertically from a first measurement 902 below the entrance side 29 to a second measurement 904 above the cell floor side 26. In an embodiment, the first measurement and the second measurement are equal. In an embodiment, the first measurement 902 and the second measurement 904 are about 15%, and about means plus or minus 5%. In the three-dimensional image of FIG. 9, one can pick any one of the outer chambers, such as outer chamber 112, and trace it through a clockwise rotation around the central axis 10. Viewing FIG. 9 with a focus at the location of the partition 906, moving from the entrance side 29 of the helicoid cell structure 100 to the cell floor side 26, the following is observed: outer chamber 108 does not have a partition in its first pitch, then the partition affects the outer chambers in this order: 106; 104; 102; 112; 110. A final pitch of outer chamber 108 is then shown.

In each outer chamber of the plurality of outer chambers, at the location of the partition 906, the partition 906 completely closes off (i.e., divides) the respective outer chamber, serving as a radially positioned wall, creating therefrom two unequal chamber lengths, and respectively, two unequal chamber volumes. The partition 906 may have a thickness equal to the outer-most continuous boundary wall. In an example, the partition 906 divides an outer chamber; the divided outer chamber is converted by the partition 906 into two modified outer chambers. In another example, the partition 906 divides a subset of available outer chambers; each outer chamber of the subset thereby becoming a divided outer chamber, which is converted by the partition 906 into two respective modified outer chambers. As described below, in various embodiments, a port opening 92 from the divided outer chamber into the inner cavity is positioned near the partition 906.

The portion adds additional functionality to the helicoid cell as follows: The partition 906 stops the movement of the sound waves traveling in an initial direction (i.e., as incoming sound waves 702 and whichever rotational direction they took at that time) and reverses the direction of the sound waves. The sound waves then move back directionally against incoming soundwaves, and/or, they find a port opening (FIG. 10, 92) and enter into an inner chamber through the port opening. As may be appreciated, in embodiments having the partition 906, each outer chamber of equal volume from the above discussion (FIGS. 5-7), may comprise two modified chambers of unequal length and unequal volume. By breaking up the sound wave movement, audible sound is dampened. Moreover, each length of the differing lengths of the modified outer chambers each dampens a different respective frequency. In this manner, the objective technical problem of efficiently damping sound waves is solved with the alternating helicoid cell with multiple unequal volume chambers.

An observer may note, by comparing FIGS. 3 and 4 to FIGS. 8 and 9, that in some embodiments, the inner chamber walls (e.g., 70 and 72) and the outer chamber walls (e.g., 90 and 92) line up, and in other embodiments, the inner chamber walls and the outer chamber walls do not line up. In various embodiments, there are two times as many outer chambers as inner chambers, i.e., in some embodiments, the second number M is twice the first number N. The outer incircle diameter is optimally the same value as the cell height 28, but the outer incircle diameter may be a value in a range of 50 percent larger or to 50 percent smaller than the cell height 28. In various embodiments, each subsequent inner incircle diameter is 50 percent the diameter of the next largest incircle diameter, plus or minus 15 percent.

Figure 10:
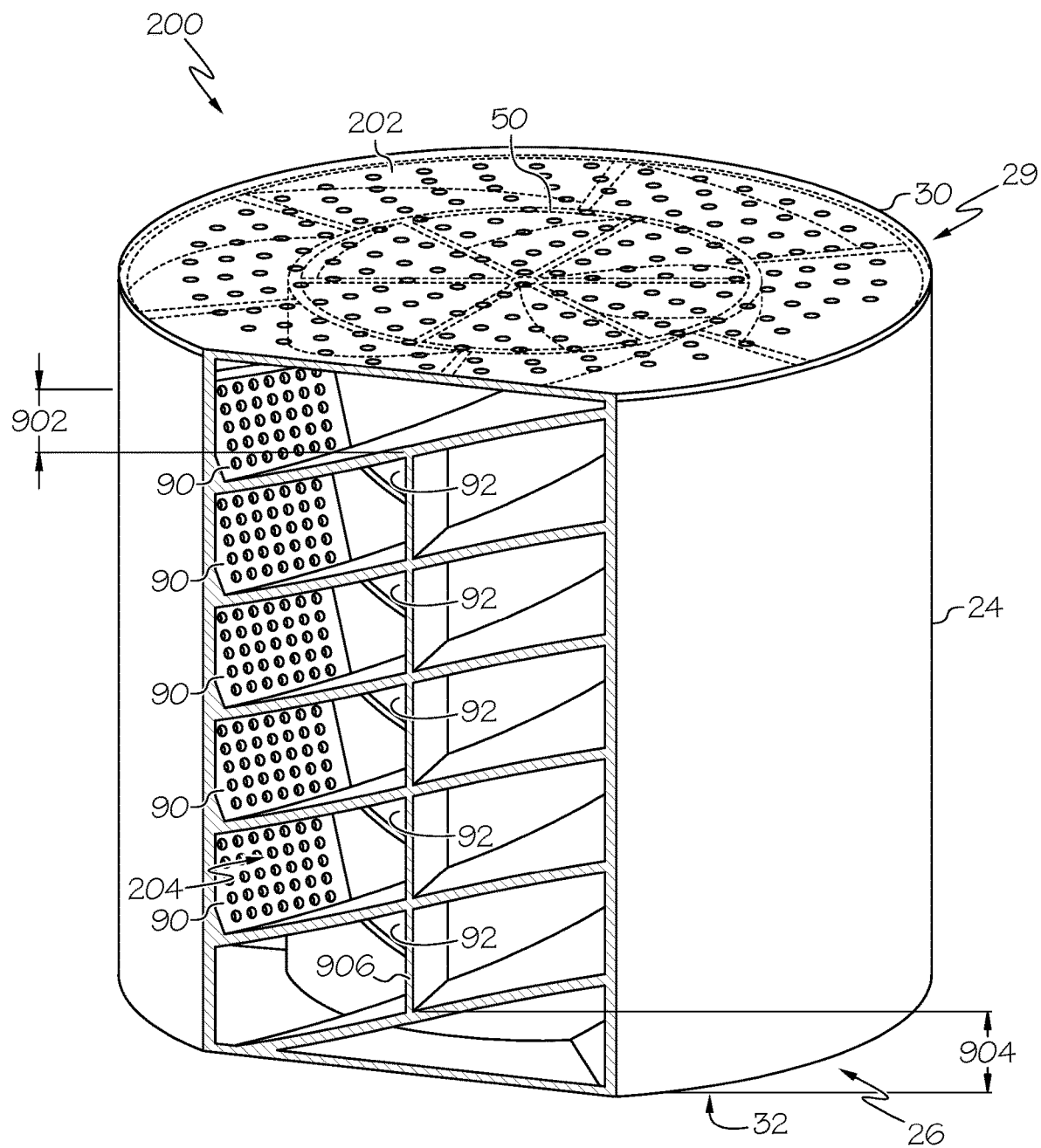
FIG. 10 is a three-dimensional diagram of a single helicoid cell structure, depicting perforated baffles and port openings, in accordance with various embodiments.
Figure 11:
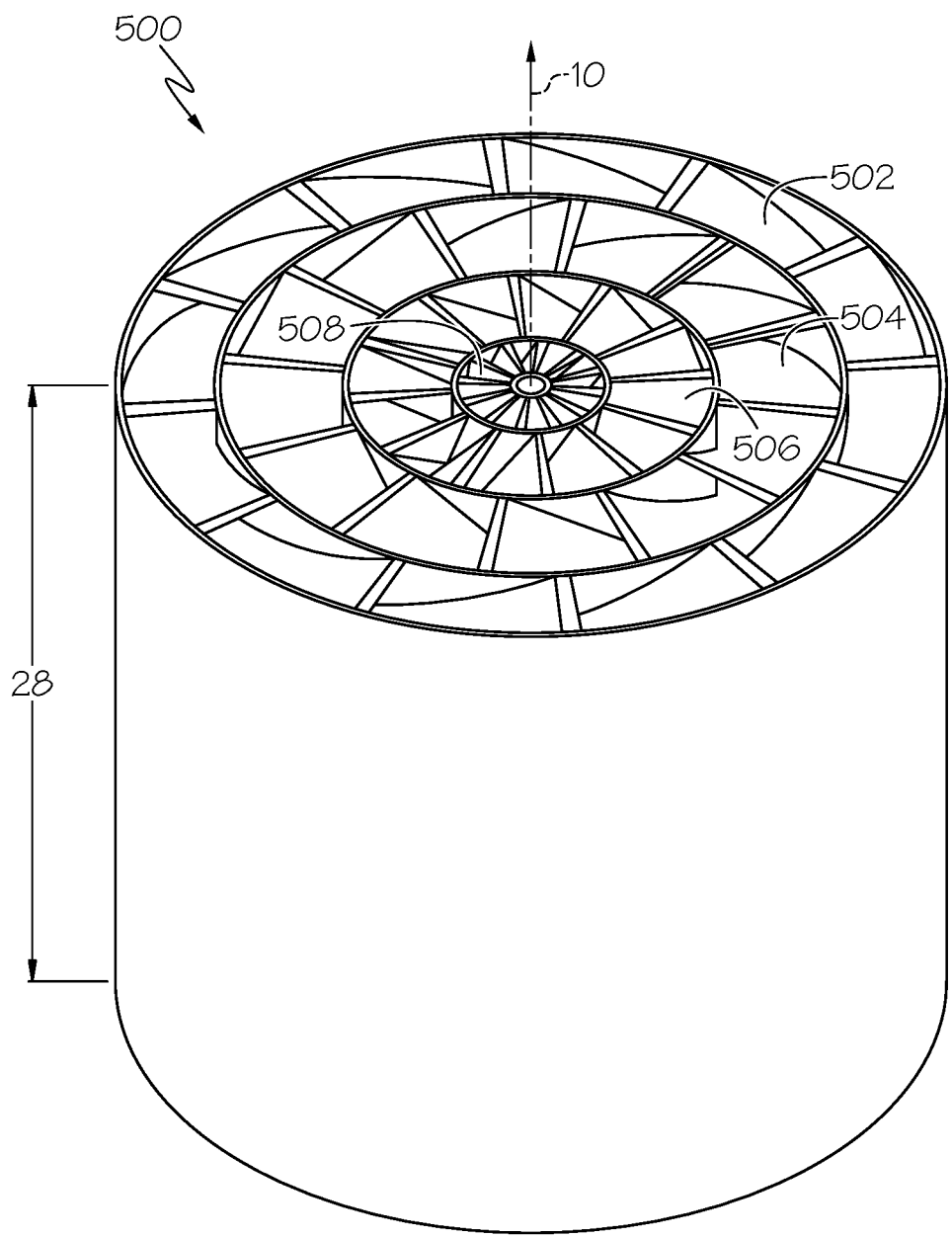
FIG. 11 is a three-dimensional diagram of a single helicoid cell structure, depicting more than two cavities, in accordance with various embodiments.
Figure 12:
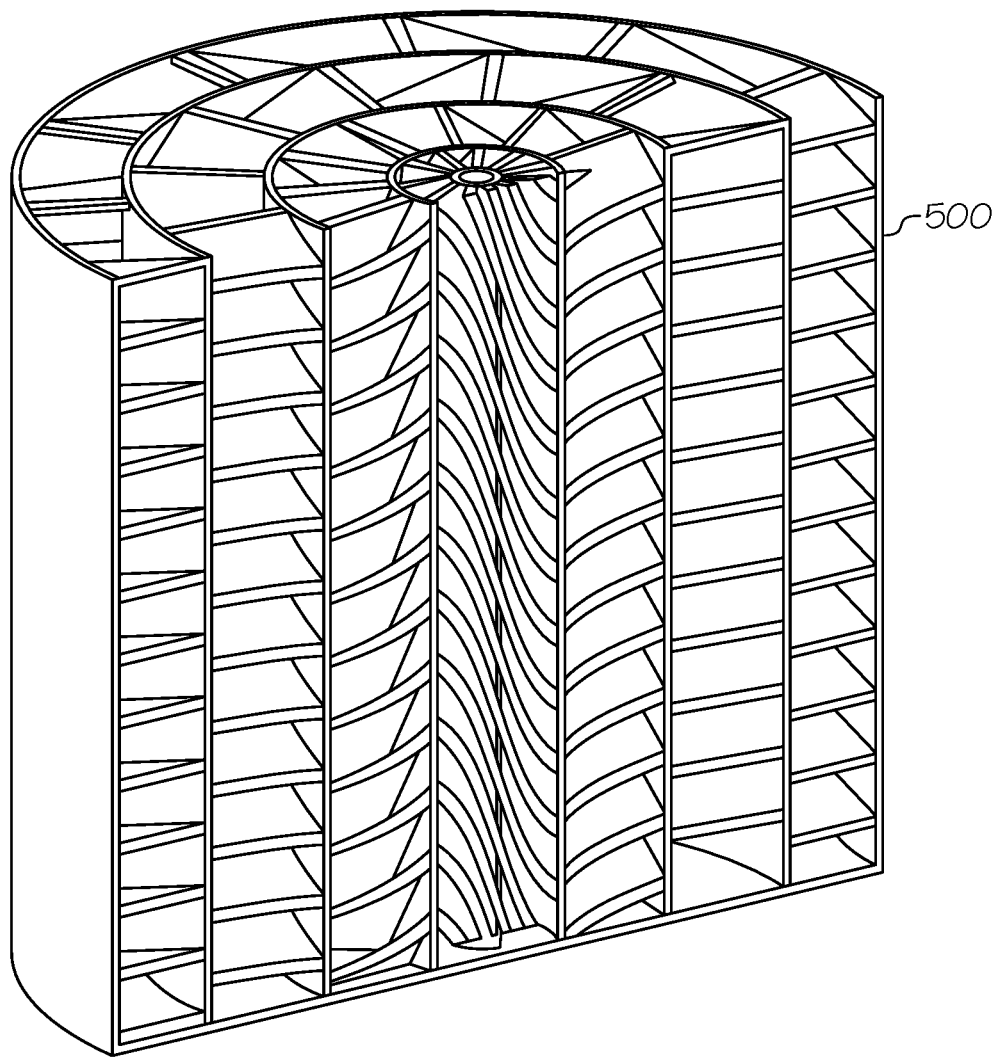

Turning to FIG. 10, another embodiment of the helicoid cell structure is depicted. Helicoid cell structure 200 depicts optional features, such as perforated baffles 90, port openings 92, and a perforated lid 202. In various embodiments, any one, two, or all three of these features may be present. These features are now described. In various embodiments, one or more of the outer chambers may have a perforated baffle 90 disposed therein. The perforated baffle 90 extends completely across the respective outer chamber cross sectional area, being perpendicular to the direction of flow of impinging sound waves 204 at the point at which the perforated baffle 90 is located. Said differently, when the perforated baffle 90 is present, it extends from, and is connected to, one outer chamber wall to a next outer chamber wall, and from (outer) first boundary wall 24 to (inner) second boundary wall 44. The perforated baffle 90 has perforations that collectively open up a cross sectional area equal to a first percentage of the outer chamber cross sectional area for throughflow of sound waves at the location of the perforated baffle 90. In an exemplary embodiment, the first percentage is between 5 and 30 percent; said differently, the perforations in the perforated baffle 90 block between 70 and 95 percent of the area exposed to the impinging sound waves 204, creating both partial reflection of the sound waves and viscous dissipation of the acoustic energy in the locality of the perforation. In an example, a perforated baffle 90 is disposed within an outer chamber, the perforated baffle extending across the outer chamber cross sectional area and having perforations that open up a first percentage of the outer chamber cross sectional area to throughflow. In another example, a plurality of perforated baffles 90 are present in a helicoid cell structure 200, each perforated baffle 90 of the plurality of perforated baffles being disposed within a respective outer chamber, the perforated baffle extending across the respective outer chamber cross sectional area and having perforations that open up a first percentage of the respective outer chamber cross sectional area to throughflow.

In various embodiments, each outer chamber further has a respective port opening 92 into the second cavity 40, the port opening 92 positioned near the partition 906. In some embodiments, the size (i.e., cross sectional area) of the port openings 92 is a function of the first percentage of the outer chamber cross sectional area. In an exemplary embodiment, the size of the port openings 92 is equal to the first percentage of the outer chamber cross sectional area. In an example, when the first percentage is 40 percent, and the cross sectional area is 1 mm-squared, the port opening is of size 0.4 times the 1 mm-squared. Further, in various embodiments, the location of the port openings 92 with respect to a location of the partition 906 is a function of the outer chamber cross sectional area. In some embodiments, a shape of the port openings 92 is triangular.

In various embodiments, the helicoid cell structure further has a perforated lid 202, as shown in FIG. 10. In practice, the perforated lid 202 could be a perforated sheet, a screen, or some other porous element, the perforated lid 202 extends completely across (i.e., covers) its respective helicoid cell structure at the entrance side. In various embodiments, the perforated lid 202 has a thickness of the outer-most continuous boundary wall of a respective helicoid cell structure.

When a plurality of helicoid cell structures are arrayed into an acoustic liner, the acoustic liner may comprise a continuous surface layer comprising, for each of the plurality of helicoid cell structures, a respective perforated lid 202. In an embodiment, the continuous surface layer created by a respective plurality of perforated lids 202 does not contribute to the attenuation of the acoustic liner; e.g., when the perforated lid 202 comprises a large perforated open area (>30% of the outer-most cross sectional area of a respective helicoid cell structure) can serve as a protective function. In other embodiments, the continuous surface layer created by a respective plurality of the perforated lids 202 contributes to the attenuation of the acoustic liner and serves as an aerodynamic flow-path, e.g., when the open area of the perforated lid 202 comprises less than 30% of the outer-most cross sectional area of a respective helicoid cell structure), this is a lower porosity and can contribute to the soundwave dissipation of the liner.

As mentioned, sound pressure, in the form of sound waves 702, enter the helicoid cell structure and are deflected down respective chambers of the alternating helicoid cell structure, following the direction/axis of rotation of a respective chamber. Some sound waves travel the same chamber for entire cell height and deflect off of the cell structure floor; in embodiments having a partition 906, some sound waves travel only part way down the chamber (i.e., a fraction of the cell height) and then deflect off of a partition 906, changing their axis of rotation and direction of travel in the helicoid cell. In embodiments having port openings 92, some sound waves enter a first chamber (inner or outer), travel only part way down the respective chamber (i.e., a fraction of the cell height) and then pass through a port opening 92 and enter into a different, new chamber and begin to be deflected in a direction of the new chamber.

In response to the sound waves 702 deflecting around in the various chambers, the helicoid cell structure creates acoustic resonances at different frequencies and induces viscous dissipation of acoustic energy at the interior and exterior porous interfaces, converting the sound waves into mechanical heat. The conversion of the sound waves into mechanical heat decreases the sound pressure reflected by the helicoid cell structure, and dampens the sound wave. This results in a lowered noise level. Arrays of the provided cell structure may be used to create acoustic panels for acoustic treatment in applications, such as aircraft, aircraft engines, automotive, mining, farming, audio equipment, heating ventilation and air conditioning (HVAC), and the like. The helicoid cell structure, and arrays thereof, may be produced using an additive manufacturing technology.

The discussion in connection with FIGS. 1-10 depicted just two cavities in the helicoid cell, in order to simplify the discussion of the basic design features of the proposed helicoid cell. However, in various embodiments, additional cavities may be utilized. In FIGS. 11-12 and 13-14, a helicoid cells having four coaxial cavities are depicted. Circular helicoid cell 500 includes cavities 502, 504, 506, and 508. Hexagonal helicoid cell 600 includes cavities 604, 606, 608, and 610. As before, starting with the inner-most cavity, the chambers are rotated around the central axis 10, and each subsequent outer cavity has chambers that rotate in an opposite direction to the cavity just inside it. The qualities of equal volumes of chambers and equal chamber wall thicknesses described above remain.

In various embodiments, when the helicoid cells are arrayed, the thickness 612 of the outer-most helicoid continuous first boundary wall 614 may be reduced to half the thickness of the respective inner walls (e.g., 616) such that, when tiled together, all of the continuous boundary walls are of equal thickness.

Figure 13:
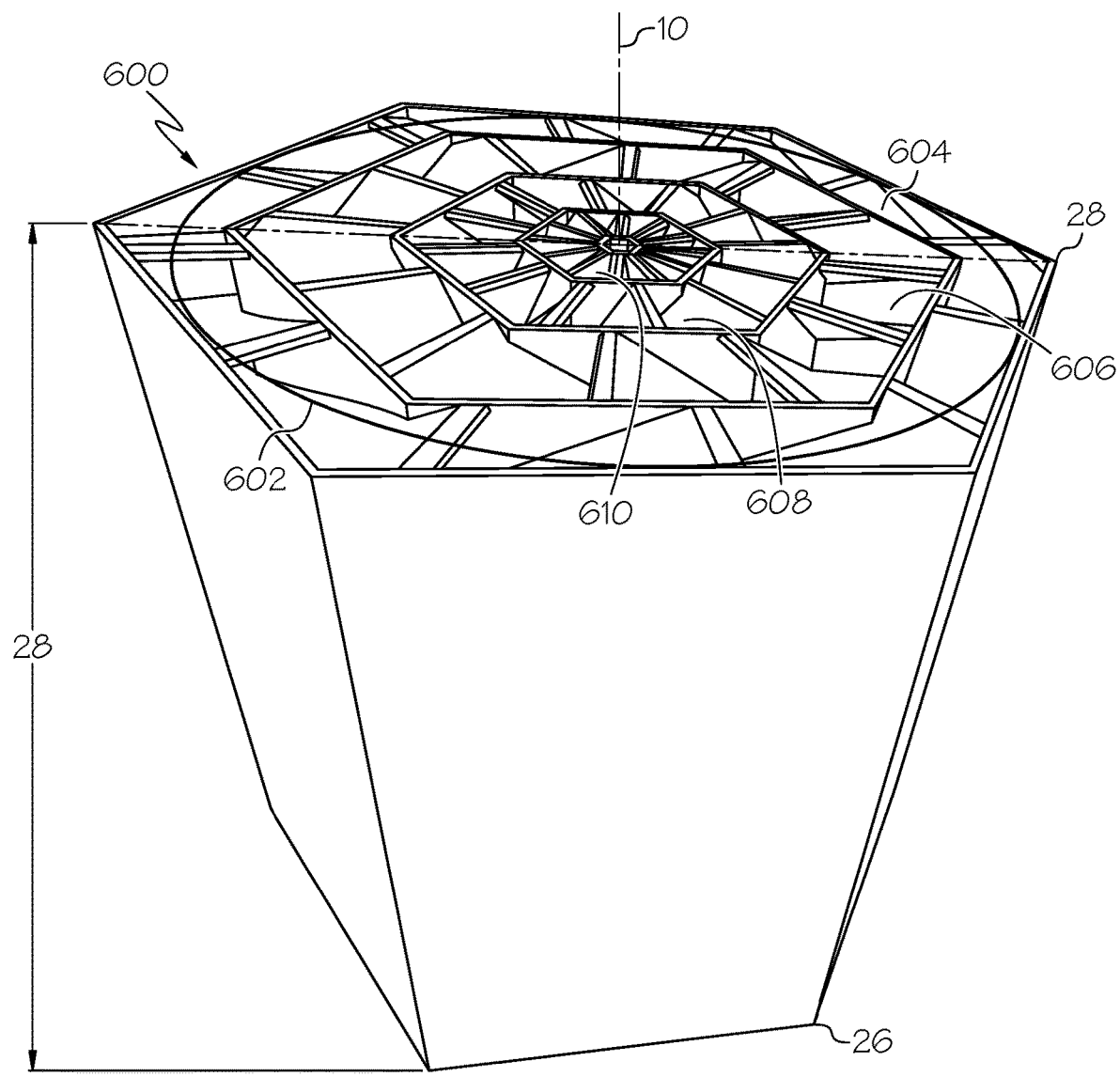
FIGS. 13-14 are three-dimensional diagrams of a single helicoid cell structure, depicting more than two cavities, in accordance with hexagonal embodiments.
Figure 14:
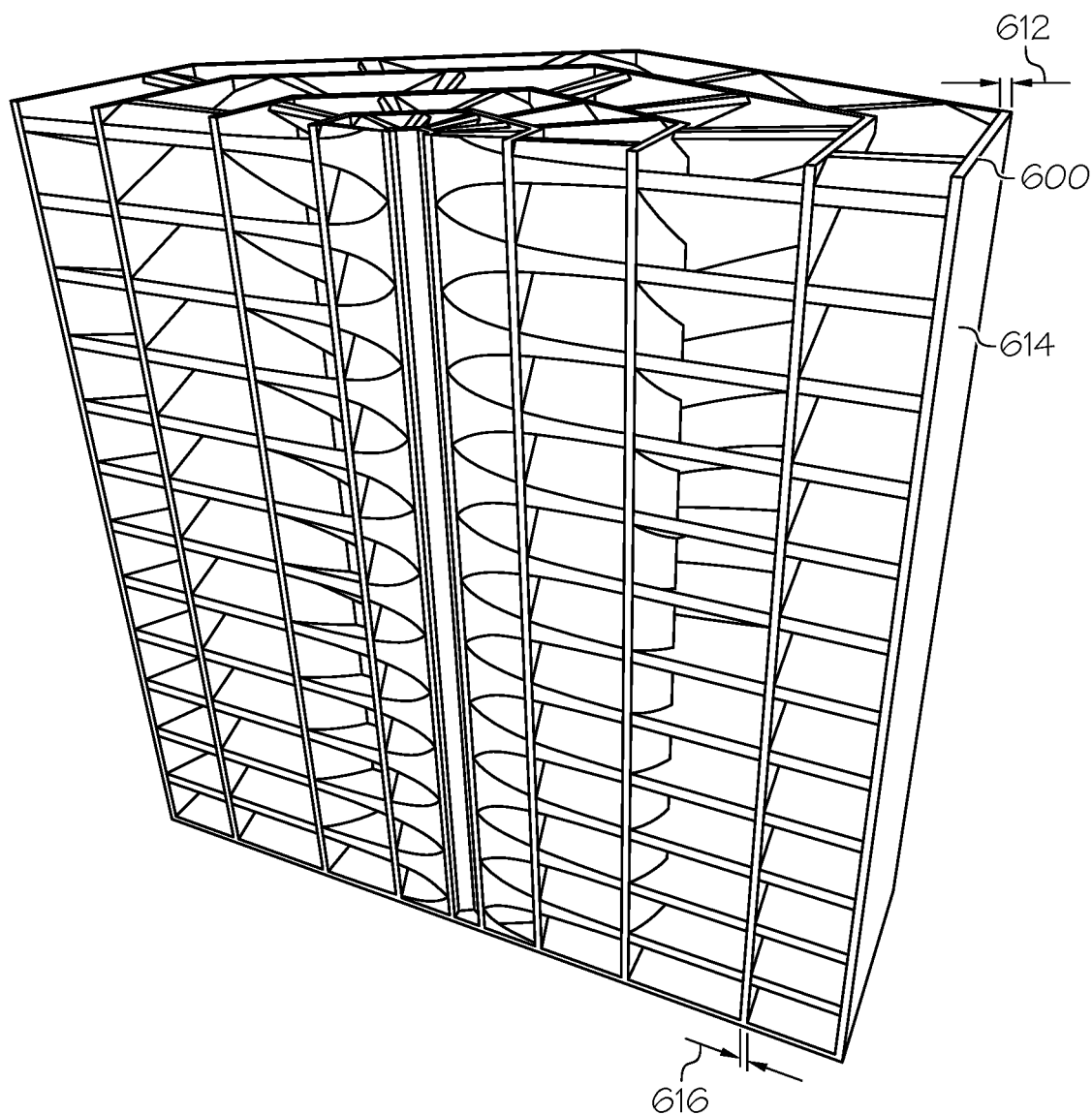

FIG. 13-14 depict a helicoid cell 600 in which the regular shape is a hexagon. Making the helicoid cells hexagonal enables easy tiling of a plurality of helicoid cells into an array for an acoustic panel, particularly for manufacturing using additive manufacturing techniques. As described above, the outer-most cavity is defined by a hexagon with incircle 602, which may be used for determining the cross sectional areas and volumes of the inner chambers; as may be appreciated, a slight adjustment is made to these numbers to move from the incircle to the respective hexagonal shape. The qualities of equal volumes of chambers and equal chamber wall thicknesses described above remain.

Further, it has been stated that the regular shape is consistent along the cell height 28. In various embodiments, as shown in FIG. 13, the cross sectional area of the regular-shape may vary from the cell structure floor side 26 to the entrance side 29. In other words, in various embodiments, the area of the hexagon making up the cell structure floor side 26 may be different than the area of the hexagon making up the helicoid cell's first cavity entrance side 29.

In some embodiments of an acoustic panel comprising a plurality of helicoid cell structures, the frequency that each helicoid cell of the plurality of helicoid cell structures is tuned to is substantially the same. However, in some applications, it is desirable to dampen multiple, predetermined, specific, frequencies; in embodiments addressing this need, an acoustic panel comprising a plurality of helicoid cell structures may be created in which each helicoid cell structure of the plurality of helicoid cell structures varies. In various embodiments, neighboring cells may have different numbers for M and N. In various embodiments, neighboring cells may have different numbers for p rotations per inch. In various embodiments, neighboring cells may have different numbers for M, N, and for p rotations per inch. In this manner, each helicoid cell in an array of helicoid cells may be tuned to a frequency that is a different one of multiple, predetermined, specific, frequencies that are relevant to a given application. As may be understood, an acoustic panel made from a plurality of integrated helicoid cell structures, each tuned to a different cell frequency, enables a technologically improved acoustic panel able to collectively absorb sound across a broad range of frequencies.

Thus, a novel alternating helicoid cell structure for use in acoustic panels is provided. The provided cell structure has a geometry that may be easily replicated into an array of a plurality of interconnected helicoid cell structures. The helicoid cell structure, and arrays thereof, may be produced using an additive manufacturing technology. As is readily appreciated, the above examples are non-limiting, and many other embodiments may meet the functionality described herein while not exceeding the scope of the disclosure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one embodiment has been presented in the foregoing detailed description of the invention, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing an embodiment of the invention, it being understood that various changes may be made in the function and arrangement of elements described without departing from the scope as set forth in the appended claims and their legal equivalents.

What is claimed is:

1. A cell structure for use in an acoustic panel, the cell structure comprising:
 a first cavity having a regular shape cross section perpendicular to a central axis, the first cavity having a continuous first boundary wall, the first cavity having a floor side, a cell height, and an entrance side defined by a first incircle, the floor side covered by a cell structure floor;
 a second cavity disposed coaxially within the first cavity, the second cavity having the regular shape cross section perpendicular to the central axis, the second cavity having a continuous second boundary wall, the second cavity having a floor side covered by the cell structure floor, the cell height, and an entrance side defined by a second incircle;
 a first number of inner chambers disposed within the second cavity from the second cavity entrance side to the cell structure floor, each of the inner chambers having an equal inner chamber cross sectional area created by radially dividing the second incircle, the inner chambers being rotated in a first direction around the central axis by at least p rotations per inch from the second cavity entrance side to the cell structure floor; and a second number of outer chambers disposed in a volume between the continuous first boundary wall and the continuous second boundary wall, from the first cavity entrance side to the cell structure floor, each of the outer chambers having an equal outer chamber cross sectional area created by radially dividing the first incircle into equally sized outer sections, the outer chambers being rotated around the central axis in an opposing direction to the first direction by the at least p rotations per inch from the first cavity entrance side to the cell structure floor;

a partition dividing an outer chamber into two modified outer chambers; and a port opening from the divided outer chamber into the inner cavity, the port opening positioned near the partition.

2. The cell structure of claim 1, wherein a size of the port opening is equal to a the first percentage of the outer chamber cross sectional area.

3. The cell structure of claim 2, wherein a shape of the port openings is triangular.

4. The cell structure of claim 3, wherein a location of the port openings is in close proximity to a location of the partition.

5. The cell structure of claim 4, further comprising a perforated lid that extends completely across the entrance side.

6. The cell structure of claim 4, wherein the first number of inner chambers is 6 and the second number of outer chambers is 6.

7. The cell structure of claim 4, wherein the second number of outer chambers is twice the first number of inner chambers.

8. The cell structure of claim 4, wherein the first percentage is between 5 and 30 percent.

9. The cell structure of claim 4, wherein the size of the port opening is equal to the first percentage of the outer chamber cross sectional area.

10. A cell structure for use in an acoustic panel, the cell structure comprising:
a continuous first boundary wall having a cell height measured between a floor side and an entrance side, the continuous first boundary wall having a central axis and defining a first cavity with a regular shape cross section perpendicular to the central axis;
a continuous second boundary wall disposed coaxially within the first cavity and defining a second cavity, the second cavity having the regular shape cross section perpendicular to the central axis, the second cavity having a floor side covered by the cell structure floor, the cell height, and an entrance side defined by a second incircle;
a first number of inner chambers disposed within the second cavity from the second cavity entrance side to the cell structure floor, each of the inner chambers having an equal inner chamber cross sectional area created by radially dividing the second incircle, the inner chambers being rotated in a first direction around the central axis by at least p rotations per inch from the second cavity entrance side to the cell structure floor; and a second number of outer chambers disposed in a volume between the continuous first boundary wall and the continuous second boundary wall, from the first cavity entrance side to the cell structure floor, each of the outer chambers having an equal outer chamber cross sectional area created by radially dividing the first incircle into equally sized outer sections, the outer chambers being rotated around the central axis in an opposing direction to the first direction by the at least p rotations per inch from the first cavity entrance side to the cell structure floor.

11. The cell structure of claim 10, further including:
a partition disposed within in an outer chamber and completely occluding the outer chamber at the location of the partition; and
a port opening positioned near the partition, the port opening located on the continuous second boundary wall of the outer chamber, providing throughput into the inner cavity.

12. The cell structure of claim 11, further including a perforated baffle disposed within the outer chamber, the perforated baffle extending across the outer chamber cross sectional area and having perforations that open up a first percentage of the outer chamber cross sectional area to throughflow.

13. The cell structure of claim 12, wherein a shape of the port opening is triangular.

14. The cell structure of claim 12, wherein a location of the port opening with respect to a location of the partition is a function of a cross sectional area of the outer chamber.

15. The cell structure of claim 12, wherein a size of the port opening is equal to the first percentage of the outer chamber cross sectional area.

16. The cell structure of claim 12, wherein there are two times as many outer chambers as inner chambers.

17. The cell structure of claim 12, wherein the first number of inner chambers is 6 and the second number of outer chambers is 6.

18. The cell structure of claim 12, wherein the first percentage is between 5 and 30 percent.

19. An acoustic panel comprising:
an array of a plurality of helicoid cell structures, each helicoid cell structure comprising:
a continuous first boundary wall having a cell height measured between a floor side and an entrance side, the continuous first boundary wall having a central axis and defining a first cavity with a regular shape cross section perpendicular to the central axis;
a continuous second boundary wall disposed coaxially within the first cavity and defining a second cavity, the second cavity having the regular shape cross section perpendicular to the central axis, the second cavity having a floor side covered by the cell structure floor, the cell height, and an entrance side defined by a second incircle;
a first number of inner chambers disposed within the second cavity from the second cavity entrance side to the cell structure floor, each of the inner chambers having an equal inner chamber cross sectional area created by radially dividing the second incircle, the inner chambers being rotated in a first direction around the central axis by at least p rotations per inch from the second cavity entrance side to the cell structure floor;
a second number of outer chambers disposed in a volume between the continuous first boundary wall and the continuous second boundary wall, from the first cavity entrance side to the cell structure floor, each of the outer chambers having an equal outer chamber cross sectional area created by radially dividing the first incircle into equally sized outer sections, the outer chambers being rotated around the central axis in an opposing direction to the first direction by the at least p rotations per inch from the first cavity entrance side to the cell structure floor; and a continuous surface layer comprising, for each of the plurality of helicoid cell structures, a respective perforated lid.

20. The acoustic panel of claim 19, wherein the array of helicoid cell structures has been generated using additive manufacturing.

\* \* \* \* \*